(No Model.)

F. S. HOGG.
CAR FENDER.

No. 523,526. Patented July 24, 1894.

WITNESSES:
Joshua Bugstrom
A. Lincott

INVENTOR
F. S. Hogg.
BY
Munn & Co.
ATTORNEYS.

UNITED STATES PATENT OFFICE.

FRANKLYN S. HOGG, OF NEW YORK, N. Y., ASSIGNOR TO HIMSELF AND BARTON B. HIGGINS, OF SAME PLACE.

CAR-FENDER.

SPECIFICATION forming part of Letters Patent No. 523,526, dated July 24, 1894.

Application filed January 19, 1894. Serial No. 497,390. (No model.)

*To all whom it may concern:*

Be it known that I, FRANKLYN S. HOGG, of New York city, in the county and State of New York, have invented a new and Improved Car-Fender, of which the following is a full, clear, and exact description.

My invention relates to an improvement in car fenders, and it has for its object to provide a fender which will be exceedingly simple in its construction, light and durable, and capable of attachment to the running gear of a car independent of its body, so that the fender will be in no manner affected by the movement of the body.
Another feature of the invention is to provide a fender which will not only guard and prevent persons from passing under the truck or wheels, but which will also serve as a cradle or receiver for persons drawn beneath the platform of a car.

A further object of the invention is to provide a means whereby the distance that the fender will approach the ground upon receiving a load may be regulated in a convenient and expeditious manner.

Figure 1:
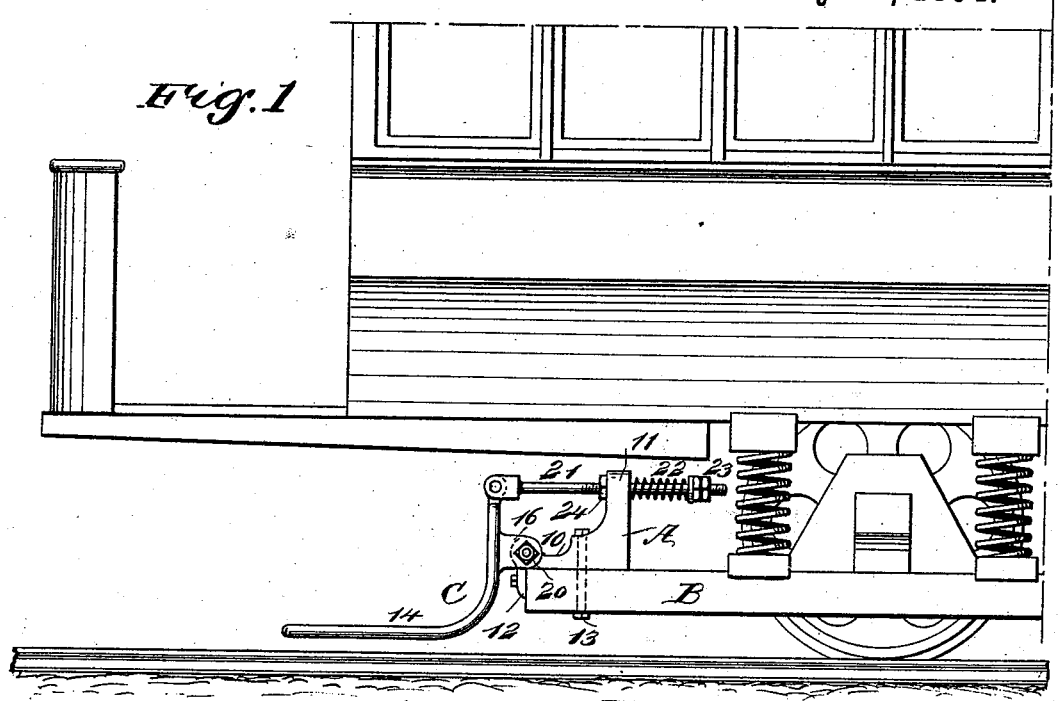
Figure 2:
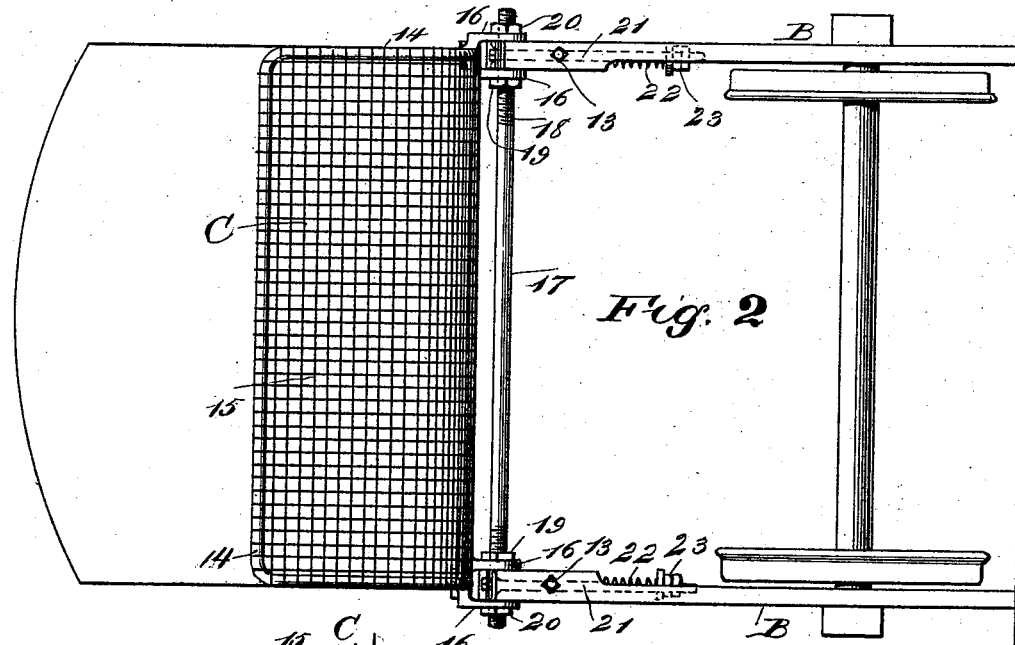
Figure 3:
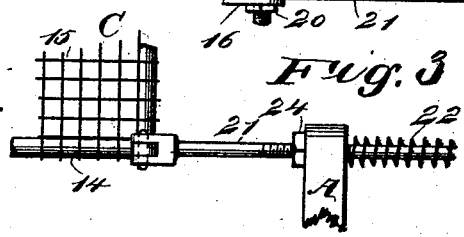

The invention consists in the novel construction and combination of the several parts, as will be hereinafter fully set forth, and pointed out in the claims.
Reference is to be had to the accompanying drawings, forming a part of this specification, in which similar figures and letters of reference indicate corresponding parts in all the views.
Figure 1 is a side elevation of the improved fender and a portion of the side of a car to which the fender is applied. Fig. 2 is a bottom plan view of the fender and that portion of the car to which the application is made;
and Fig. 3 is a detail view of the tension device employed in connection with the fender proper.

In carrying out the invention the fender is preferably attached to the truck B of the car, and at the outer end of the truck. In making such an attachment a bracket A, is located upon each side of the car truck, the said brackets preferably consisting of a body 10, which rests upon the upper face of the truck, a standard 11, located at the rear of the body and extending in an upwardly direction, and a foot 12, located at the front of the body and adapted for engagement with the front end of the sides of the truck, as is best shown in Fig. 1. The brackets are ordinarily secured to the truck through the medium of bolts 13, passed through them and through the sides of the truck, and bolts are preferably also passed through the feet or shoes 12 of the brackets and into the truck.

The fender C, is somewhat angular in construction and comprises a frame 14 of skeleton construction, embracing a vertical and a horizontal member, the two members being connected preferably upon a curve, and the frame 14 is made to carry a bed 15, preferably of a netting of any description, as for example woven wire, the bed being made to extend from top to bottom and from side to side of the frame, following the general contour of it.

The top portion of the fender at each side is provided with rearwardly-extending lugs 16, and these lugs are adapted to receive between them the forward portions of the body sections 10 of the brackets A; and a pivotal connection is effected between the ears or lugs and the brackets by passing a shaft 17 from one bracket to the other through the ears 16, the end portions of the shaft being threaded, as shown at 18 in Fig. 2, in order that lock nuts 19 and 20 may be located upon the threaded portions of the shaft and carried to more or less of a frictional engagement with the ears 16, it being understood that the shaft 17 is loosely mounted in the brackets, and consequently the fender is free to drop under pressure at its horizontal portion, and in the event its ears do not move freely upon the shaft the shaft will turn in its bearings.

The fender is maintained in its normal position through the medium of tension devices, two of said devices being usually employed one at each side of the fender. These tension devices consist of a rod 21, pivotally connected with an upward extension at the sides of the fender, and the rods are passed through openings made in the upper ends of the standard sections 11 of the brackets, and a lock nut 24 is screwed upon each rod to an engagement with the forward faces of said standard sections, while a spring 22, is coiled around each rod, having bearing against the rear faces of the standard sections and against lock and jam nuts 23 located upon the inner ends of the rods. Thus it will be observed that by manipulating the nuts 23 and 24, the horizontal member of the fender may be held a given distance from the ground, and the distance that the horizontal member will drop under a load is regulated by the strength of the springs 22 employed and the manipulation of the said nuts 23 and 24.

This fender is exceedingly simple and durable, and it is economic in its construction, and when applied to a car will be concealed by the platform and will act both as a carrier and as a guard.

Having thus described my invention, I claim as new and desire to secure by Letters Patent—

1. The combination with the fender having a forwardly and an upwardly extending portion and means for pivoting the fender to a car truck, of sliding rods engaging the rear side of said upwardly extending portion, bearings in which the rods slide, nuts on the rods in front of the bearings for adjusting the forwardly extending portion toward and from the road bed and springs forcing the upwardly extending member rearwardly, substantially as described.

2. The combination with the fender having a forwardly extending front portion and an upwardly extending rear portion, of brackets to which said rear portion is pivoted and adapted to be secured to a car truck, rods extending from said rear portion through apertures in the upper ends of the brackets, and springs on the rods between their free ends and the adjacent face of said brackets, substantially as shown and described.

3. The combination, with a support adapted to be attached to the truck of a car, of a fender of substantially angular construction, the vertical member whereof is pivotally connected with said support, and tension devices consisting of spring-controlled rods provided with bearings in which they freely slide and pivotally connected with the fender near its pivot point, nuts on the rods in front and rear of said bearings and springs on the rods between the rear nuts and the rear sides of the bearings, whereby by adjusting the front nuts the fender may be set at any desired height from the road bed and by adjusting the rear nuts the tension of the springs may be regulated as and for the purpose specified.

FRANKLYN S. HOGG.

Witnesses:
J. FRED ACKER,
JNO. M. RITTER.